3,544,497
PREPARATION OF POLAR PETROLEUM RESINS
Jean Guerrier, Rouen, and Jacques Hamard, Mont-Saint-Aignan, France, assignors to Esso Research and Engineering Company, a corporation of Delaware
No Drawing. Filed Aug. 7, 1967, Ser. No. 658,661
Claims priority, application France, Aug. 8, 1966, 72,469
Int. Cl. C08f *27/00*
U.S. Cl. 260—23.7                                    22 Claims

ABSTRACT OF THE DISCLOSURE

Petroleum resins are reacted with unsaturated fatty acids to produce a resin containing polar groups. This resin has increased adherence to substrates.

---

The present invention relates to a process for making polar petroleum resins.

Petroleum resins are capable of being used in a very large number of applications, in particular, whenever it is desired to ensure the protection of surfaces from moisture, corrosion, chemicals etc. However, in spite of the diversity of their chemical nature, they have all a purely hydrocarbon structure and do not therefore contain any polar function. This takes the form of a total lack of adherence, for it is recognised that the adherence of a film of resin to an underlying surface increases with the number of polar groups. The absence of a polar function also results in almost total inertia in relation to the classic chemical reagents, and this may sometimes have advantages, but more often drawbacks.

The only petroleum resins having polar functions have been obtained by the action of maleic anhydride under very severe conditions of temperature and pressure. The maleic resins thus obtained are moreover highly coloured, having a Gardner colour above 14, which limits their use to a very large extent.

The applicants have discovered that it is possible to add acid functions to the petroleum resin.

According to the invention unsaturated fatty acids are reacted with a petroleum resin at a temperature between 200 and 320° C., better still between 280 and 320° C., in an inert atmosphere, for preference with constant replacement of inert gas, at normal pressure or possibly at reduced pressure. The reaction conditions should be such that there is no risk of distilling the fatty acids.

The petroleum resins that can be used according to the invention can be thermoplastic resins obtained by polymerisation, in the presence of a Friedel-Crafts catalyst, of steam-cracked petroleum distillates, boiling in the range between 30 and 280° C. approximately, or of any fractions of these distillates boiling within this range; this polymerisation is carried out at temperatures ranging for preference from 0° to 70° C. approximately, and better still from about 10 to 55° C. Instead of steam-cracked petroleum distillates, the charge to be polymerised may consist of a mixture of olefines and diolefines, containing sufficient of the latter to obtain a resin and not an oil or a rubbery substance. These resins are polydienic in character, and their softening point is between 50 and 180° C.

It is also possible to use the resins obtained by thermal polymerisation of steam-cracked distillates boiling between 30 and 280° C. approximately, by keeping them at a high temperature, for preference between 230 and 320° C., and better still, between 230 and 270° C., at a pressure in the region of 10 to 30 atmospheres, and better still, from 15 to 25 atmospheres, the polymer obtained then being distilled at a temperature ranging from 220 to 350° C., and better still, from 260 to 290° C., to separate the resin and the distillate, which can be recycled.

It is also possible to use resin resisitant to hydrocarbons, such as butadiene-styrene copolymers with a high proportion of styrene, acrylonitrile butadiene etc.

It is also possible to use unsaturated polymers with bromine number above 20, such as the liquid resin known by the name of "Clay Treated Louisiana Polymer" (C.T.La. Polymer).

The preferred fatty acids are those which have double conjugate bonds or bonds which are capable of conjugation at the temperature of the reaction, for instance linoleic, linolenic, oleo-stearic acids, etc.

It is also possible to have recourse to mixtures of fatty acids derived from the saponification of a drying or semi-drying oil, such as the fatty acids from linseed, soya, safflower, dehydrated castor oil, fish, "tall oil" etc.

The reacting mixtures can contain by weight 5 to 99% resin, and better still, 50 to 90%. The time of the reaction will be in the region of ½ hour to 10 hours.

Without wishing to limit the invention to theoretical considerations, it is thought nevertheless that the preparation according to the invention can be interpreted by a reaction of the Diels-Alder type:

$$\text{Fatty acids} \longrightarrow \text{Acid resin}$$

The following examples, which are given by way of illustration and in no sense restrictively, will better show the scope and importance of the invention.

EXAMPLE 1

Use was made of a petroleum resin obtained by polymerisation in the presence of $AlCl_3$ of light naphtha derived from the steam cracking of a petroleum distillate and having the following characteristics:

| | |
|---|---|
| Ball-ring softening point, ° C | 100 |
| Mean molecular weight | 1600±200 |
| Gardner colour (50% solution in toluene) | 8 |
| Bromine number | 25 |

There was moreover selected a mixture of linseed fatty acids having the following composition (percent by weight):

| | |
|---|---|
| Stearic acid | 10 |
| Oleic acid | 15 |
| Linoleic acid | 30 |
| Linolenic acid | 45 |

Three systems were examined:

a mixture of fatty acids and resin
a mixture of thermally polymerised fatty acids and resin
a reaction products according to the invention.

The fatty acids were polymerised at 295° C. in an atmosphere of nitrogen, at normal pressure, with a delivery of nitrogen of 0.1 litre/minute.

The products according to the invention were prepared at 295° C. in an atmosphere of nitrogen, at normal pressure, with a delivery of nitrogen of 0.1 litre/minute. The percentage of fatty acids varied from 20 to 50% by weight and the time of the reaction from 2 to 6 hours.

After the elimination of the fatty acids that had not reacted, by extraction of potassium salts or by means of a hydro-alcoholic solution, the acid number of the resin was found.

In the first two cases, it was less than 1; in the case of the products according to the invention, it was between 15 and 25 according to the conditions of operation.

The percentage by weight of combined resin in relation to the weight of resin used was calculated as a function of this acid number, and the following results were obtained:

| Percent weight in initial charge— | Time of reaction (hours) | | |
|---|---|---|---|
| | 2 | 4 | 6 |
| Fatty acid, 20; Resin, 80 | | 40±4 | 50±5 |
| Fatty acid, 25; Resin, 75 | | 53±6 | 74± |
| Fatty acid, 50; Resin, 50 | | | 50±5 |

The polar resin obtained from the 25/75 mixture, and after 6 hours' heating, had the following characteristics:

Acid number _____ 22
Gardner colour (50% in toluene) _____ 11
Ball-ring softening point, °C. _____ 65

EXAMPLE 2

A thermal resin with ball-ring softening point 160° and Gardner colour (50% in toluene) of 9 was used.

The mixture of resin: 50% by weight and linseed fatty acid 50% by weight was subjected to 3 hours' heating at 295° C., at normal pressure, in an atmosphere of nitrogen with a delivery of 0.1 litre per minute.

After eliminating the fatty acids that had not reacted, a polar resin was obtained whose acid number was 50 and Gardner colour 12.

It is obvious that the present invention had been explained by way of illustration and in no sense restrictively and that any useful modification may be made to it without departing from its scope.

What is claimed is:

1. A process for making petroleum resins containing a polar group which comprises heating a mixture of petroleum resin and an unsaturated fatty acid to a temperature between 200 and 320° C., in an inert atmosphere, at a pressure not greater than normal pressure.

2. A process as claimed in claim 1 wherein the reaction is carried out with constant replenishment of inert gas.

3. A process as claimed in claim 1 wherein the petroleum resin is thermoplastic resin obtained by polymerisation between 0 and 70° C., in the presence of a Friedel-Crafts catalyst, of steam-cracked petroleum distillates, boiling in the range between 30 and 280° C.

4. A process as claimed in claim 3 wherein the resin is obtained by polymerisation at a temperature of between 10° and 55° C.

5. A process as claimed in claim 1 wherein the petroleum resins are obtained by thermal polymerisation of steam-cracked distillates boiling between 30 and 280° C., at a pressure in the region of 10 to 30 atmospheres, the polymer thereafter being distilled at a temperature between 220 and 350° C. for separating the resin from the distillate.

6. A process as claimed in claim 5 wherein the temperature of the thermal polymerisation is between 230 and 320° C.

7. A process as claimed in claim 5 wherein the pressure of the thermal polymerisation is between 15 and 25 atmospheres.

8. A process as claimed in claim 5 wherein the polymer obtained is distilled at a temperature between 260° C. and 290° C. for separating the resin from the distillate.

9. A process as claimed in claim 1 wherein the petroleum resin is a resin resistant to hydrocarbons.

10. A process as claimed in claim 1 wherein the resin is an unsaturated polymer with a bromine number above 20.

11. A process as claimed in claim 10 wherein the resin is Clay Treated Louisiana Polymer.

12. A process as claimed in claim 1 wherein the fatty acid is selected from the group conisting of fatty acids having conjugate bonds, and fatty acids having bonds which are capable of conjugation at the temperature of the reaction.

13. A process as claimed in claim 12 wherein the acid is linoleic, linolenic, or oleostearic acid.

14. A process as claimed in claim 1 wherein the fatty acid is selected from the group conisting of fatty acids derived from the saponification of drying oils and semi-drying oils.

15. A process as claimed in claim 1 wherein the fatty acid is selected from the group consisting of tall oil fatty acids and the acids derived from linseed oil, soya oil, safflower oil, dehydrated castor oil, and fish oil.

16. A process as claimed in claim 1 wherein the reaction mixtures contain from 5 to 99% by weight of resin.

17. A process as claimed in claim 16 wherein the proportion of resin is between 50 and 90% by weight.

18. A polar petroleum resin comprising the reaction product of a thermoplastic petroleum resin and an unsaturated fatty acid, said reaction being carried out at a temperature between 200 and 320° C. in an inert atmosphere at a pressure not greater than atmospheric pressure, said thermoplastic petroleum resin being a polymerized steam-cracked petroleum distillate boiling in the range of 30 to 280° C.

19. A polar petroleum resin comprising the reaction product of a thermoplastic petroleum resin and an unsaturated fatty acid, said reaction being carried out at a temperature between 200 and 320° C. in an inert atmosphere, at a pressure not greater than atmospheric pressure, said thermoplastic petroleum resin being a catalytically polymerized steam-cracked petroleum distillate boiling in the range of 30 to 280° C., the polymerization being effected at a temperature of 0 to 70° C. in the presence of a Friedel-Craft catalyst.

20. A polar petroleum resin as claimed in claim 19 wherein the resin, in proportions of 50 to 90% by weight on the starting blend, is combined with unsaturated fatty acids derived from vegetable and animal fatty acids, said acids having a carbon chain length of 16 to 24 carbon atoms.

21. A polar petroleum resin comprising the reaction product of a thermoplastic petroleum resin and an unsaturated fatty acid, said reaction being carried out at a temperature between 200 and 320° C. in an inert atmosphere at a pressure not greater than atmospheric pressure, said thermoplastic petroleum resin being a thermally polymerized steam-cracked petroleum distillate boiling in the range of 30 to 280° C., the polymerization being effected at a temperature between 230° C. and 320° C. at a pressure of 10 to 30 atmospheres, followed by distilling the polymerization product at a temperature between 220 and 350° C. to separate the resin.

22. A polar petroleum resin as claimed in claim 21 wherein the resin, in proportions of 50 to 90% by weight on the starting blend, is combined with unsaturated fatty acids derived from vegetable and animal fatty oils, said acids having a carbon chain length of 16 to 24 carbon atoms.

References Cited

UNITED STATES PATENTS

| 2,750,298 | 6/1956 | Kiebler, Jr. et al. | 106—222 |
| 2,880,188 | 3/1959 | McKay | 260—23.7 |
| 2,952,646 | 9/1960 | Carmody | 260—20 |
| 3,070,568 | 12/1962 | Gessler et al. | 260—41 |
| 3,161,620 | 12/1964 | Perkins, Jr. et al. | 260—78.4 |
| 3,205,185 | 9/1965 | Lessells et al. | 260—23 |
| 3,247,142 | 4/1966 | Brunson et al. | 260—23 |

DONALD E. CZAJA, Primary Examiner

R. A. WHITE, Assistant Examiner

U.S. Cl. X.R.

260—82